United States Patent [19]

LaRoche et al.

[11] Patent Number: 4,895,690
[45] Date of Patent: Jan. 23, 1990

[54] METHOD FOR CASTING COLORED DETAILS

[75] Inventors: Wayne D. LaRoche, Farmington; John D. Gray, New Durham, both of N.H.

[73] Assignee: Davidson Textron Inc., Dover, N.H.

[21] Appl. No.: 313,522

[22] Filed: Feb. 22, 1989

Related U.S. Application Data

[62] Division of Ser. No. 77,435, Jul. 24, 1987.

[51] Int. Cl.$^4$ ................. B29B 17/00; B29C 39/12
[52] U.S. Cl. ........................ 264/245; 264/37; 264/255; 264/301; 264/310
[58] Field of Search ................. 264/245–247, 264/255, 309, 163, 256, 301–304, 308, 310, 113, 122, 125, 37; 249/104, 103, 140; 425/112, 123, 435, 130, 256, 257

[56] References Cited

U.S. PATENT DOCUMENTS

| | | | |
|---|---|---|---|
| 2,007,961 | 7/1935 | Bolton | 264/247 X |
| 2,861,911 | 11/1958 | Martin et al. | 264/309 X |
| 4,011,292 | 3/1977 | Randall | 264/245 X |
| 4,252,762 | 2/1981 | Stevenson | 264/255 X |
| 4,472,451 | 9/1984 | Mulder | 425/112 X |
| 4,519,972 | 5/1985 | Stevenson | 249/104 X |
| 4,562,025 | 12/1985 | Gray | 264/DIG. 60 X |
| 4,562,032 | 12/1985 | Gandreau | 264/267 |
| 4,606,868 | 8/1986 | Christoph et al. | 264/302 X |
| 4,610,620 | 9/1986 | Gray | 425/435 X |
| 4,634,360 | 1/1987 | Gray | 425/435 X |
| 4,683,098 | 7/1987 | Belleville et al. | 425/435 X |
| 4,716,003 | 12/1987 | Gaudreau | 264/302 |

FOREIGN PATENT DOCUMENTS

| | | | |
|---|---|---|---|
| 0142113 | 2/1984 | Japan | 264/245 |
| 808311 | 3/1981 | U.S.S.R. | 249/140 |

Primary Examiner—Jan H. Silbaugh
Assistant Examiner—Karen D. Kutach
Attorney, Agent, or Firm—John C. Evans

[57] ABSTRACT

Apparatus and a process for manufacturing plastic shells having decorative features thereon includes a method for casting thermoplastic material against a heated mold by use of a combination mask and container unit (hereinafter referred to as the combination unit) that is joined to a known heated mold to deposit a first semi-cured deposit on the mold from supplies of material in the combination mask and container; the mask is configured to have a plurality of wire reinforced foot portions with sealing edges configured to be aligned with the sharp edges of recesses in the mold surface defining the decorative feature; when the combination unit is inverted it casts material only on the recesses to form a semi-fused deposit of a first color. The combination unit is separated from the mold which is then processed to a higher fusion temperature and a base layer of contrasting thermoplastic material is cast thereon to be bonded to the recess material prior to cooling and stripping the mold.

7 Claims, 4 Drawing Sheets

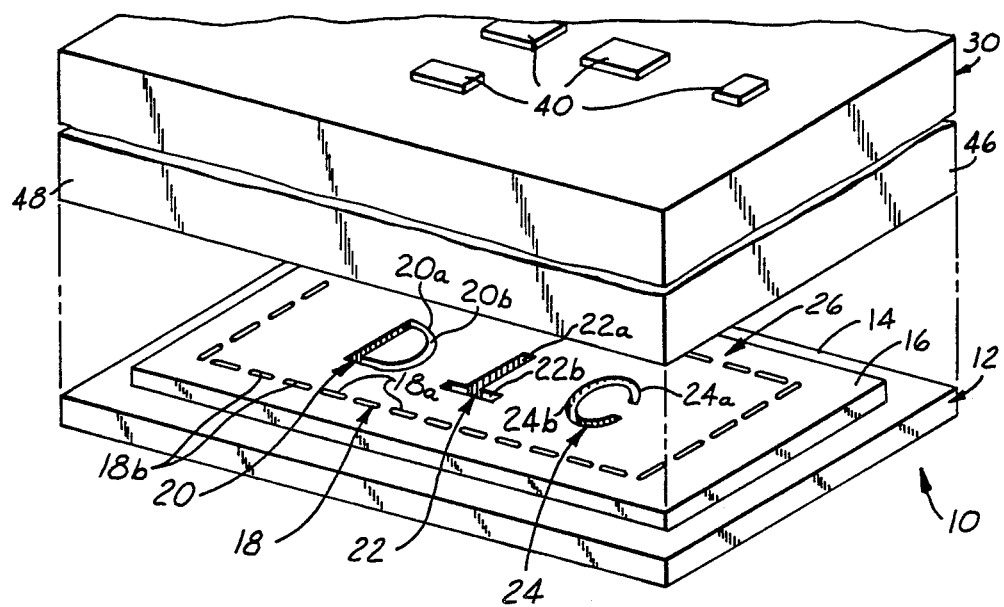
FIG.1
FIG.2
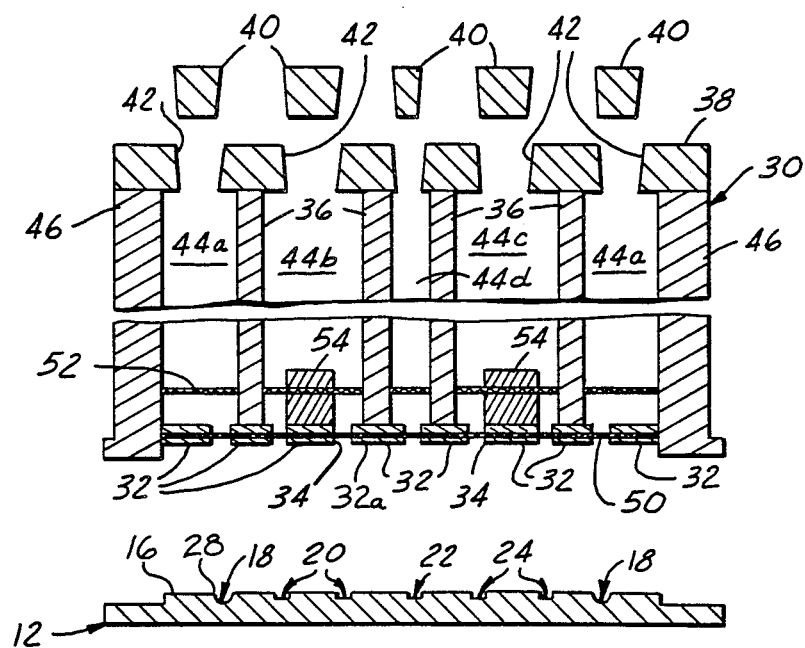

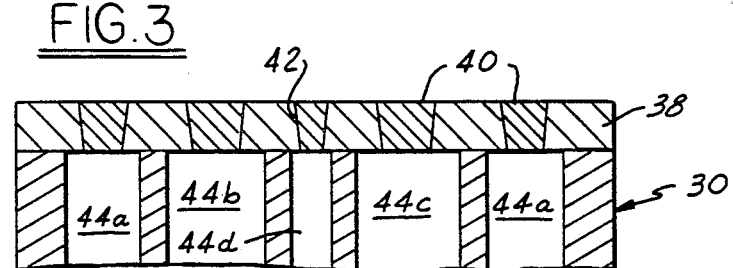
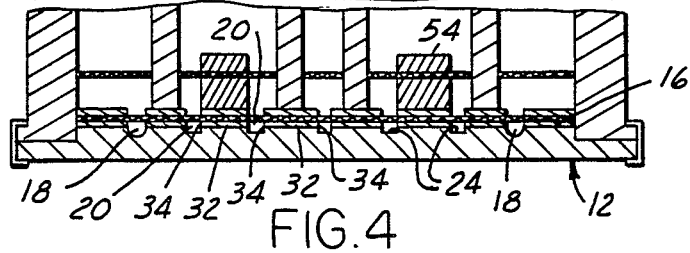
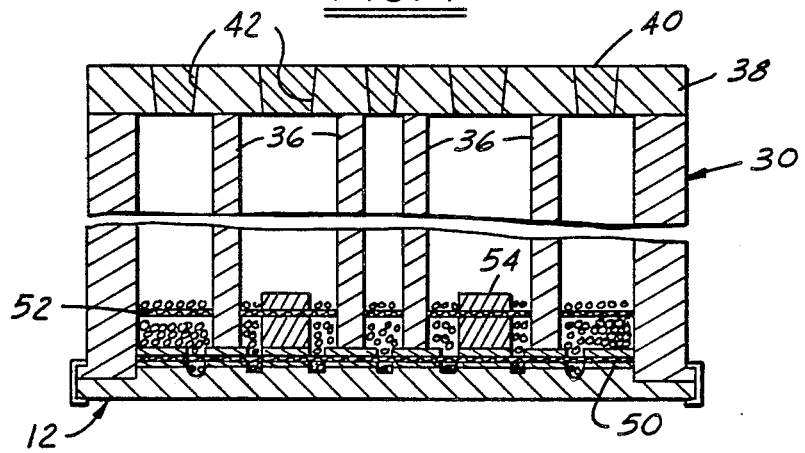
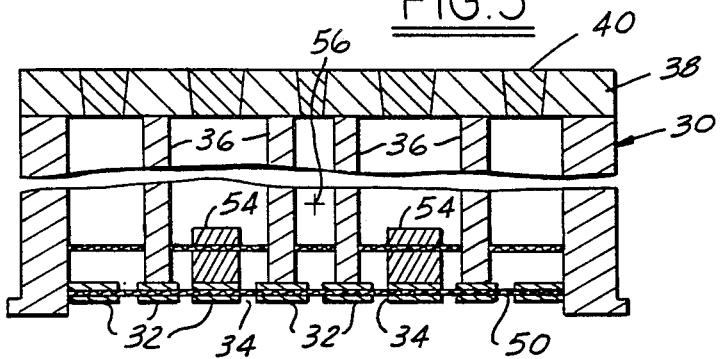
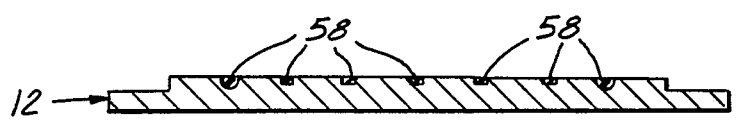

METHOD FOR CASTING COLORED DETAILS

This is a division of application Ser. No. 077,435, filed on July 24, 1987.

TECHNICAL FIELD

This invention relates to cast thermoplastic shells and more particularly to improved apparatus and an improved method for producing cast thermoplastic articles with decorative features of contrasting color formed in situ of a base layer.

BACKGROUND ART

Various proposals have been suggested for forming a thin plastic shell product by apparatus and methods which utilize a heated mold and a casting system for distributing thermoplastic material on the mold. When the mold is heated the cast material is melted and fused to form a shell conforming to the shape of the mold.

U.S. Pat. No. 4,610,620 discloses apparatus for molding plural colored plastic hollow shells by a process in which a decorative pinstripe is formed as an integrally bonded joint between first and second segments of th shell. The joint between the shell components is used to replace a mechanical connection between the segments and to define a color contrasting decorative feature in the finished part. The decorative feature is limited to a joint line application and is not formed in situ of a background base layer bonded thereto.

U.S. Pat. No. 4,562,025 discloses a mold method and apparatus for multicolored plastic shells which include first and second colored segments on the cast shell product directly bonded to one another. Again, there are no decorative features formed in situ on the cast shell components of the product.

U.S. Pat. No. 4,562,032 discloses a method for forming grain coverings on reaction injection molded articles. Such coverings are found on instrument panels and can include embedded stitch features around the periphery of the article to simulate stitched material.

Other proposals have been suggested for providing decorative features on plastic articles, including attachment of the decorative feature by separate connectors or by the use of adhesives.

STATEMENT OF INVENTIONS AND ADVANTAGES

In the present invention one feature is the provision of a method for casting thermoplastic material on a heated mold surface by the steps of defining decorative features in the mold surface in the form of recesses having sharp peripheral edges; providing a combined mask and container unit with foot portions having edge seals; conforming the edge seals to the peripheral edges of the recesses to mask all other parts of the mold surfaces except for the recesses; heating the mold to a first sub-fusion temperature and casting thermoplastic material from the combined unit to deposit it only in the recesses; separating the combined unit from the mold and reheating it to a fusion temperature and thereafter casting a base layer of color contrasting thermoplastic material against the mold and the deposited material to bond the base layer and deposited material prior to cooling and stripping the mold.

Another feature of the present invention is to provide an improved apparatus for casting contrasting color deposits on a mold surface having a compartment for the thermoplastic material wherein the improvement comprises a casting mold having a recess formed therein with a marginal edge defining the outline of a decorative feature; combined mask and container means including heat resistant foot portions with sealing edges of a form to correspond to the marginal edge of the recesses and engageable with said mold to cover the mold in surrounding relationship to the recesses; and means in the combined mask and container means to supply dry thermoplastic material to the recesses when the sealing edges are in alignment with the marginal edges thereof while masking other portions of the mold; means for heating the mold to a temperature less then the fuse temperature of the thermoplastic material to produce a semi-cured deposit of material in the recesses; and means for distributing and heat bonding a color contrasting base layer of thermoplastic material on a semi-cured deposit to cure and bond both it and the base material prior to cooling and stripping the mold.

Another feature of the present invention is to provide a combined mask and container means including spaces between the foot portions with dry thermoplastic material flowable into recesses when the combined mask and container means is inverted with respect to said mold; means for heating the mold to a temperature below the fuse temperature of the mold to cause material deposited therein to form a semi-cured deposit on the mold; means for placing container means on the mold and applying a base layer of thermoplastic material across the semi-cured deposit and the remainder of the mold; and the means for heating being operable to raise the mold to a temperature at which the semi-cured deposit and base layer will be fused and bonded prior to cooling and stripping the mold.

Still another feature is to provide bridge means joined to each of the foot portions for reinforcing the combination mask and container means, the bridge means overlying each recess and providing a path for depositing the thermoplastic material.

Other advantages and a more complete understanding of the invention will be more apparent from the succeeding detailed description of the invention and the accompanying drawings thereof.

BRIEF DESCRIPTION OF THE DRAWINGS

FIG. 1 is a perspective view of mold tooling including the present invention;

FIG. 2 is a sectional view showing the component parts of the tooling of FIG. 1 separated;

FIG. 3 is a sectional view showing the component parts joined;

FIG. 4 is a sectional view showing the components distributing dry thermoplastic material;

FIG. 5 is a sectional view showing a combined mask and compartment unit separated from a casting mold;

DETAILED DESCRIPTION OF THE INVENTION

Figure 6:
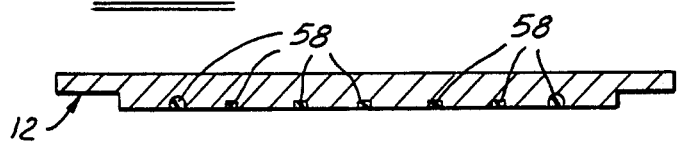
FIGS. 6–8 show mold tooling for casting a base layer of thermoplastic material on decorative feature segments.

The present invention will be discussed with reference to the manufacture of either decorative colored lettering formed in situ of a base layer of thermoplastic material or the manufacture of colored stitching in such base layer. The manufacture resulting from use of the apparatus and process of the present invention can be of many kinds including luggage made from plastic, interior trim parts for automobiles, furniture, toys or any other article which desirably includes decorative features or indicia therein.

Referring to FIG. 1 mold tooling 10 is illustrated including a casting mold 12 which is adapted to be selectively heated to raise a casting surface 14 thereon to controlled temperatures above and at the melt/fuse temperature of thermoplastic material being cast thereon.

The casting surface 14 includes a normal surface 16 with a plurality of recesses 18, 20, 22, 24 therein. The recesses 18 are configured as a perimeter stitch around letters 20, 22, 24 which define a logo 26.

Each of the recesses have a peripheral edge 28 that is a sharp break line at the normal surface 16.

In accordance with the present invention each of the recesses 18, 20, 22, 24 are supplied with a different colored thermoplastic material which is deposited in the recesses to form a decorative feature in situ of a base layer of material.

The invention includes a combination masking and compartment unit 30 (hereinafter referred to as the combination unit 30) which is configured to supply the aforementioned colored material and to further seal the casting surface 14 so that material is only deposited in the recesses when the combination unit 30 is joined to the casting mold 12.

The combination unit 30 includes a plurality of spaced foot portions 32 each having a seal edge 34 configured to conform to the shape of the peripheral edges 28 of the recesses. The foot portions 32 are formed of cast RTV which will seal against the mold surface 14 but will be heat resistant so that thermoplastic material will not be deposited as a build up thereon during the casting process.

The foot portions 32, in the illustrated embodiment are joined to vertical walls 36 which connect at their upper end to a cover 38. The cover 38 has a plurality of feed plugs 40 therein for closing openings 42 into compartments 44 formed between each of the vertical walls 36. The vertical walls 36 cooperate with said walls 46, 48 to separate the compartments 44 from each other so that a different color of thermoplastic material can be stored in each of the compartments 44 without mixing. The thermoplastic material is a resin with a plasticizer and dye components and is formed as a dry powder material having a particle size in the range of 50–350 microns.

The combination unit 30 is reinforced by two sheets of wire mesh material 50, 52. The wire mesh sheet 50 is cast into the foot portions 32 and bridges the gaps therebetween which define the width and length of the recesses 18–24. The mesh is sized to permit free gravity flow through the sheet 50 during a casting step to be discussed.

The sheet 52 bridges the vertical walls 36 to reinforce the compartments 44. In the illustrated arrangement the shape of the lettering is such that two of the foot portions 32 have a pier segment 64 thereon that is joined to the sheet 52 but which serves to locate the foot portion to seal the peripheral edges of the recesses defining the illustrated letters D and C into which different colored material is flowed from compartments 44b, 44c. Compartment 44a is a compartment which surrounds the lettering compartments and includes a color of material which will highlight a stitch feature deposited into the stitch recesses 18.

When the combination unit 30 is joined to the casting mold 12 as shown in FIG. 3 the plugs 40 are removed and the mold is heated to a desired pre-fusion temperature at which the thermoplastic material will partially fuse on the casting mold 12.

Material of different colors is fed into the compartments 44a–44d and the plugs 40 are inserted into the cover. The joined casting mold 12 and combination unit 30 are rotated about preselected axes, for example, a horizontal axis 56 to distribute the material in each of the compartments 44a–44d to a selected one of the mold recesses 18–24.

When the combination unit 30 is joined to the casting mold the seal edges 34 on the foot portions 32 will completely seal the normal mold surface 16 so that the thermoplastic material in the compartments 44a–44d will only be cast into the recesses defining the decorative feature. The mold tool 12 is preferably heated to a temperature below the cure temperature of the deposited material so that the recesses will be filled with material that adheres thereto but is only semi-cured.

The combination unit 30 is disconnected from the mold tool 12 once the semi-cured deposits are formed therein as shown in FIG. 5 with any excess material being returned to the compartments 44a–44d.

Figure 7:
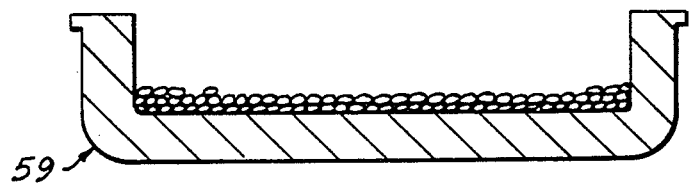
Figure 8:
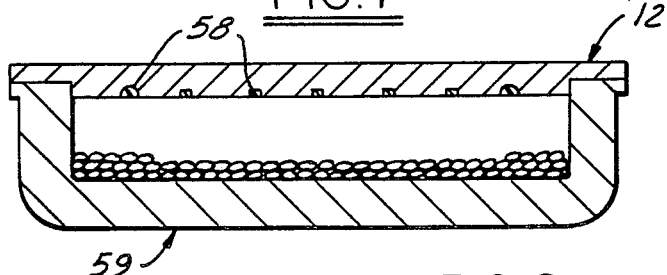
Figure 9:
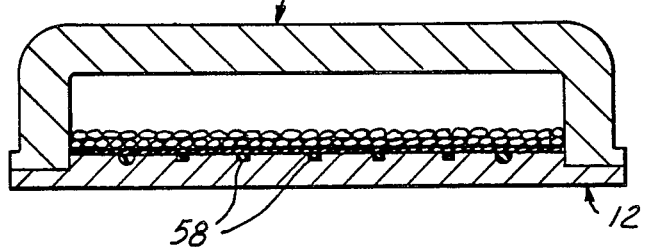
FIG. 9 is a view of a product made by the process of the present invention.

The mold tool 12 with semi-cured segments 58 therein is then heated to a temperature which will fuse the thermoplastic material therein and to be cast thereagainst. The mold tool 12 is connected to a source 59 of contrasting color thermoplastic material and the joined units shown in FIG. 7 are inverted as shown in FIG. 8 to cast a base layer 60 of thermoplastic material against the mold surface 14 to cover the segments 58 and the exposed portions of the normal surface 16. The base layer 60 is fused and bonded to the segments 58. The mold is then cooled and stripped to form the article 62 shown in FIG. 9 having raised lettering 64 of three different colors surrounded by a raised stitch 66 of a color which differs from that of the base layer 60. Each of the letters and the stitch are formed in situ of the base layer 60 at the bond joint therebetween.

Figure 10:
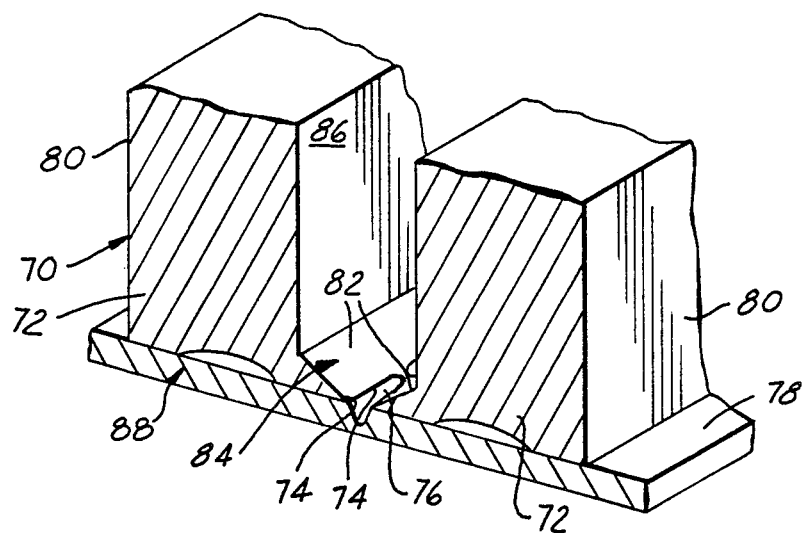
FIG. 10 is a fragmentary perspective view of a combined masking and compartment unit for use in the manufacture of colored stitch features.

The embodiment of the invention shown in FIG. 10 is a fragment of a combination masking and compartment unit 70 which corresponds to the combination unit 30. In the unit 70 all the foot portions 72 are configured to have a peripheral sealing edge 74. It is conformed to stitch recesses 76 in a mold tool surface 78. The foot portions 72 each have flat vertical surfaces 80 on one side and inwardly sloping surfaces 82 on the other side. Surfaces 82 form a chute 84 leading from a dry powder compartment 86 to the recesses 76. The chute 84 serves to focus the thermoplastic flow into the recesses to assure complete filling of the stitch defining surfaces thereof. The foot portions 72 are made from a suitable heat resistant material with low heat conductivity. Thermoplastic material will not adhere to such material. The combination unit 70 is connected to a mold tool 88 at the surface 78 thereon. It is operated in the same manner as combination unit 30. A semi-cured deposit in the recesses 76 of a color contrasting to that of a base layer which is formed on the mold tool surface 78. It is formed in the same manner as discussed with respect to the previous embodiment.

Figure 11:
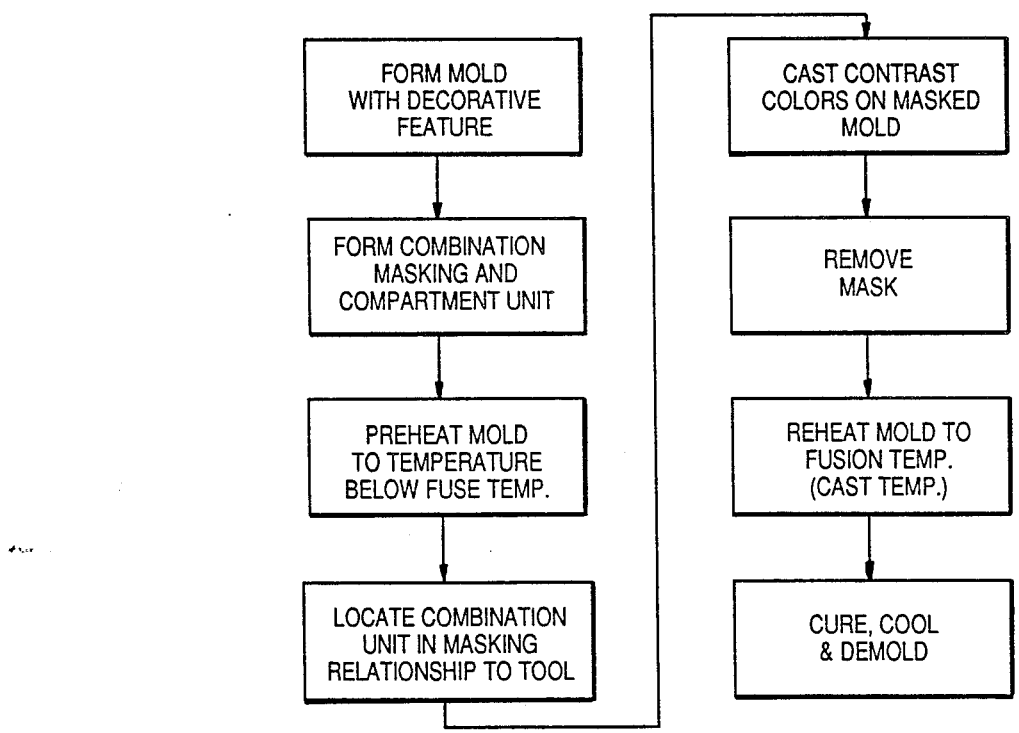
FIG. 11 is a flow chart showing the process of the present invention.

The process is set forth in FIG. 11 as including the steps of preforming a mold tool with a desired recess decorative pattern cut in a normal mold surface. The combination masking and compartment unit is designed to conform to the pattern of the recesses by arranging the feed compartments in alignment only with the recesses and masking all other portions of the mold surface from the material in the container spaces.

The mold is then preheated to a temperature below the fusion temperature of the thermoplastic material and the material in the container spaces is cast as a contrasting color into the recesses where it is semi-cured.

The combination unit is removed from the mold tooling to unmask the normal casting surface of the mold tooling. The mold tool is then reheated to a casting temperature at which the thermoplastic material will be fused and another source (contrasting color) of thermoplastic material is deposited on the normal surface and the decorative segments. The material is cured to bond the different colored materials. The previously deposited material in the recesses is fused to the base layer which has a color that is different from the color or colors of the decorative feature.

The mold is then cooled and stripped or demolded to form a plastic part with a colored background with raised decorative features on the eye discernible surface of the background which features are formed in situ of the base layer material.

Various different color effects can be achieved with a given logo design by forming individual color compartments behind the color mask.

While representative embodiments of apparatus and processes of the present invention have been shown and discussed, those skilled in the are will recognize that various changes and modifications may be made within the terms of the present invention as set forth in the following claims.

What is claimed is:

1. In a process for forming colored stitch features in a thermoplastic shell which is formed by depositing thermoplastic material against a heated mold surface having a stitch groove formation formed in the mold surface the method comprising:

providing a stitch groove formation in the mold surface having sharp break lines between the stitch grooves and surrounding portions of the mold surface;

providing a masking construction having a plurality of foot portions configured to have sealing edges congruent to the sharp break lines of the stitch grooves;

heating the mold surface;

joining the heated mold surface and the masking construction to align the sealing edges of the foot portions with the sharp break lines of the stitch grooves thereby covering all portions of the heated mold surface except for the stitch grooves and depositing a first layer of thermoplastic material only into the stitch grooves of the molding surface;

removing the masking construction from the heated mold surface; and depositing a base layer of thermoplastic material onto the heated mold surface and the first layer of thermoplastic material deposited within the stitch grooves so as to bond and fuse the deposited base layer to the first layer of thermoplastic material deposited within the stitch groves and cooling and stripping the bonded layers from the mold surface so as to form the stitch features as an eye discernible color contrasting decorative feature in the base layer of thermoplastic material.

2. In a process for forming a desired decorative feature in situ in a base layer of thermoplastic material in a shell made from thermoplastic material cast against a heated tool having a mold surface thereon the method comprising:

forming recesses, having peripheral edges, on the mold surface corresponding to the desired decorative feature;

providing a mold mask having foot portions with sealing edges and sources of thermoplastic material;

connecting the mold mask with the sources of thermoplastic material to the tool to seal the peripheral edges of the recesses of the mold surface with the sealing edges of the foot portions of the mold mask thereby only exposing the recesses to the sources of the thermoplastic material;

depositing a first thermoplastic material of one color in the recesses in the mold surface and heating the tool to partially cure the first deposited thermoplastic material in the mold surface recesses;

removing the mold mask from the tool;

heating the mold tool to the fuse temperature of the first deposited thermoplastic material and depositing a base layer of a second thermoplastic material across the surface of the mold and the first deposited thermoplastic material to cover the first deposited thermoplastic material and thereby fuse the base layer to the first deposited thermoplastic material in the recesses;

cooling and stripping the fused base layer of thermoplastic material from the mold surface so as to from a shell with a decorative feature defined by the first deposited thermoplastic material in situ in the base layer of thermoplastic material.

3. In the combination of claim 2, the thermoplastic material being deposited as a dry powder on the heated mold tool.

4. In a process for forming a desired decorative feature in situ in a base layer of thermoplastic material in a shell made from thermoplastic material having a fuse temperature cast against a heated tool having a mold surface thereon the method comprising:

forming recesses in a reference mold surface with the recesses defining the desired decorative feature therein to receive and retain cast material for subsequent bonding to the base layer of thermoplastic material that is cast to cover the reference mold surface so as to produce a raised, color contrasting, decorative feature on the base layer;

providing a masking construction having a plurality of foot portions with peripheral edges corresponding to peripheral edges of the recesses for covering all portions of the reference mold surface except for the recesses formed therein when the masking construction is connected to the heated tool;

providing separate sources of the thermoplastic material between each of the foot portions;

heating the reference mold surface of the tool to a temperature lower than the fuse temperature of the thermoplastic material;

connecting the masking construction to the tool to align the peripheral edges of the foot portions with the peripheral edges of the recesses of the reference mold surface to expose only the recesses to the separate sources of thermoplastic material;

inverting the connected masking construction and tool for depositing a first layer of the thermoplastic material into the recesses of the reference mold surface;

reinverting the connected masking construction and tool for recycling unused thermoplastic material to the separate sources of the thermoplastic material;

removing the masking construction from the tool;

heating the reference mold surface of the tool to a temperature to melt and fuse the first layer of thermoplastic material; and casting a base layer of thermoplastic material against the reference mold surface and the first layer of thermoplastic material to bond and fuse the first layer of thermoplastic material to the base layer, and then cooling the reference mold surface of the tool and stripping the bonded base layer and first layer of thermoplastic material from the reference mold surface thereby forming the color contrasting, raised, decorative feature on the base layer.

5. In the process of claim 4, providing a mask construction having a compartment between the foot portions defined in part by a chute for concentrating a source of thermoplastic material against the recesses of the mold.

6. In the process of claim 4, depositing the thermoplastic material by directing it from the sources along convergent paths terminating in the recesses defining the decorative feature.

7. In the process of claim 4, forming the recesses of the reference mold surface as lettering surrounded by the foot portions of the masking construction;

selecting the first deposited thermoplastic material as a color which contrasts with the color of the thermoplastic material of the base layer.

* * * * *